Patented June 2, 1942

2,284,827

UNITED STATES PATENT OFFICE 2,284,827

WATER SOFTENING AND CLARIFICATION

Frederick K. Lindsay and John W. Ryznar, La Grange, Ill., assignors to National Aluminate Corporation, Chicago, Ill., a corporation of Delaware No Drawing. Application August 3, 1940, Serial No. 351,115

10 Claims. (Cl. 210—23)

This invention relates to water softening and clarification and has for an object the provision of a composition of matter and a method which are useful for producing a flocculent precipitate in waters being subjected to softening or clarification.

It is well known that a large, rapidly settling floc is desirable in the successful operation of industrial and municipal lime-soda softening plants. If the precipitate or floc formed during the softening reaction is small, it will settle only very slowly or not at all within a practical length of time, with the result that the precipitate is carried over to the filter beds, causing the filters to become clogged, thus resulting in much shorter filter runs. Also, in softening reactions where recarbonation is employed, a water containing a fine floc undergoing recarbonation has a tendency to require much more carbon dioxide gas than one containing no floc and a water of higher hardness results after the recarbonation step.

In the process of softening water by means of lime and sodium carbonate (soda ash), waters which contain relatively high concentrations of magnesium have a tendency to flocculate readily and the floc formed facilitates subsequent settling and clarification of the treated water. This is probably due to the gelatinous and flocculent characteristics of the magnesium hydroxide precipitated during the treatment. It is also well known that the use of sodium aluminate as a coagulant in a lime-soda softening process accelerates the rate of coagulation and precipitation and reduces the residual hardness in the treated water beyond that obtainable by the use of lime and soda ash alone. We have found, however, that, in the softening of certain types of waters, such as waters of low hardness concentration or waters of low magnesium content, or any waters subjected to a partial softening with lime wherein not sufficient lime is used to precipitate the magnesium that is present, uniform and complete flocculation is not always obtainable by the addition of sodium aluminate alone to these waters.

It is, therefore, an object of this invention to provide a composition and method for producing a desired heavy floc in waters undergoing chemical treatment which have a relatively small amount of hardness.

A further object of this invention is the provision of a method and a composition which will cause desired coagulation and flocculation in a water undergoing treatment in the absence of small quantities of precipitated magnesium hydroxide.

A further object of this invention is the provision of a means for providing a coagulant for a water undergoing treatment which will serve to clarify the water and remove any colloidal material that may be suspended therein.

A further object of this invention is the provision of a coagulant for treating water which has a normally slightly alkaline reaction.

Further and additional objects will appear from the following description and the appended claims.

We have found that a suitable coagulant for many types of water treatment, particularly softening and clarification, comprises a combination of an alkali aluminate and a clay having unusual colloidal properties, known as bentonite. Bentonite has a strong physical affinity for water and absorbs up to ten times its volume of water with consequent increase in bulk. It is a natural hydrous silicate of aluminum, having the distinctive property of forming a homogeneous and highly viscous solution, sol, or gel in the presence of more than about ten times its weight of water. Chemically it may be represented by the formula $$Al_2O_3.4SiO_2.4H_2O$$

We have discovered that, when a water is treated with a small amount of this bentonite and a small amount of an alkali aluminate, such as sodium aluminate, while the water is undergoing a water softening or clarifying treatment, a large floc is formed which serves to clarify the water of precipitated or other colloidal matter and the floc readily settles out from the water before it is passed through the filter beds or subjected to a recarbonation step.

For a more complete understanding of this invention, several examples are given below which clearly illustrate the improvement obtained in water treatment by the use of the combination of alkali aluminate and bentonite. It has been discovered, as will be clear from the examples, that the combination of these materials is superior to either one used alone, even though smaller quantities are used in the combination. Furthermore, the treatment may be advantageously used in several types of water softening procedures.

Example I

A raw water was divided into four samples and each was subjected to a lime and soda ash softening treatment by the addition of hydrated lime and sodium carbonate (soda ash) thereto, as indicated in Table No. 1. Sample No. 1 was not treated with a coagulant, but bentonite, sodium aluminate, and a combination of sodium aluminate and bentonite was added to the other samples in the amounts indicated. Visible coagulation or flocculation was noted in each of the samples. The raw water had the following characteristics: H=3.75, Ca=2.5, Mg=1.25, M=3.2, in which H=grains per gallon of total hardness expressed in terms of $CaCO_3$, Ca=grains per gallon of calcium hardness expressed in terms of $CaCO_3$, Mg=grains per gallon of magnesium hardness expressed in terms of $CaCO_3$, and M=grains per gallon of total alkalinity, using methyl orange as indicator, expressed in terms of $CaCO_3$. In the following table, the amounts of reactants employed are represented in grains per gallon of water treated.

Table No. 1

| Sample No.— | Treatment in grains per gallon | | | | Coagulation results |
|---|---|---|---|---|---|
| | Hydrated lime | Soda ash | Sodium aluminate | Bentonite | |
| 1 | 5.6 | 4.0 | | | Poor to fair. |
| 2 | 5.6 | 4.0 | | 2.0 | Good. |
| 3 | 5.6 | 4.0 | 0.5 | | Fair. |
| 4 | 5.6 | 4.0 | 0.5 | 0.5 | Very good. |

The above results clearly indicate that the combination of sodium aluminate and bentonite produced better coagulation than either bentonite or sodium aluminate taken alone, and that the flocculation is very much better than in the water which was not treated with a coagulant at all. It is pointed out that the results obtained when the combination of aluminate and bentonite was used (sample 4) were superior to the results obtained when twice as much bentonite was used alone, as indicated in sample 2.

EXAMPLE II

Samples of a raw water were treated with lime and soda ash in the amounts indicated in Table No. 2. To some of this water was added bentonite alone, to some, sodium aluminate alone, and to another portion a combination of sodium aluminate and bentonite, as above indicated in connection with Example I. The raw water had the following characteristics: H=5.7, Ca=4.3, Mg=1.4, M=4.9.

Table No. 2

| Sample No.— | Treatment in grains per gallon | | | | Coagulation results |
|---|---|---|---|---|---|
| | Hydrated lime | Soda ash | Sodium aluminate | Bentonite | |
| 1 | 8.0 | 3.5 | | 2.4 | Fair to poor. |
| 2 | 8.0 | 3.5 | 2.0 | | Good to fair. |
| 3 | 7.6 | 3.2 | 0.5 | 2.0 | Excellent. |

The results shown in the above table also clearly indicate the superior coagulation obtained by the combination of aluminate and bentonite in the presence of hydrated lime and soda ash.

EXAMPLE III

In this example, a relatively hard raw water having the following hardness characteristics was treated: H=49, Ca=31, Mg=18, M=23.6. In this example only lime was employed as a softening agent and was only used in amounts sufficient to precipitate the calcium bicarbonate in the water.

Table No. 3

| Sample No.— | Treatment in grains per gallon | | | Coagulation results |
|---|---|---|---|---|
| | Hydrated lime | Sodium aluminate | Bentonite | |
| 1 | 23.0 | | | Poor to fair. |
| 2 | 23.0 | | 2.0 | Fair to good. |
| 3 | 23.0 | 0.5 | | Fair to poor. |
| 4 | 23.0 | 0.5 | 1.0 | Very good. |

Much better coagulation by the combination of bentonite and aluminate is shown here where the water treated was hard but insufficient lime softener was added to precipitate the magnesium hydroxide. The water supply of this example may, after removal of the floc, be subjected to carbonation, filtration, and zeolite softeners to remove sulfate hardness.

The use of the alkali metal aluminate-bentonite combination for promoting coagulation and flocculation is not limited to lime or lime-soda ash softening reactions. For example, in hot process softening, where heat is applied to aid in the acceleration and completion of the softening reaction, the combination of this invention may be effectively used in conjunction with an alkali and an ortho phosphate, such as disodium phosphate. This is shown in the following two examples.

EXAMPLE IV

A raw water was treated as indicated in connection with the foregoing examples with the chemicals in concentrations shown in Table No. 4. The water had the following hardness characteristics: H=0.9, M=0.7, $SiO_2$=13 parts per million.

Table No. 4

| Sample No.— | Treatment in grains per gallon | | | | | Coagulation results |
|---|---|---|---|---|---|---|
| | Hydrated lime | Soda ash | Disodium phosphate (anhydrous) | Sodium aluminate | Bentonite | |
| 1 | 6.0 | 1.0 | 3.0 | | | Fair. |
| 2 | 6.0 | 2.0 | 2.0 | 0.5 | | Poor to fair. |
| 3 | 6.0 | 1.0 | 3.0 | 0.5 | 2.0 | Good. |

EXAMPLE V

A raw water subjected to a disodium phosphate and sodium hydroxide softening treatment was also subjected to the action of the coagulants as indicated in connection with the previous examples. The raw water had the following characteristics: H=1.8, Ca=1.3, M=1.6, $SiO_2$=0.8 part per million.

Table No. 5

| Sample No.— | Treatment in grains per gallon | | | | Coagulation results |
|---|---|---|---|---|---|
| | Sodium hydroxide | Disodium phosphate | Sodium aluminate | Bentonite | |
| 1 | 1.0 | 1.5 | | | Poor. |
| 2 | 1.0 | 1.5 | 0.5 | | Poor. |
| 3 | 1.0 | 1.5 | | 2.0 | Poor. |
| 4 | 1.0 | 1.5 | 0.5 | 2.0 | Good. |

From the results indicated in the above examples, it is clear that in certain types of water softening treatments the combination of sodium aluminate and bentonite is superior to either of the substances used alone and promotes the ready formation of a floc which will rapidly settle out of the water undergoing treatment. In several of the examples given, it is evident that smaller dosages of the combined aluminate and bentonite can be used, giving much better results than are obtained by using larger amounts of either one by itself. The coagulating efficiency is thus accomplished through the use of a combination of the two materials.

We have formulated a theory which may possibly explain the results obtained by the use of this combination. However, it is only presented here as a possible aid to a more complete understanding of this invention and we do not wish to be limited in any way by it. The formation of the floc by a coagulating agent is thought to take place in two general steps, first, the formation of nuclei by mutual condensation and removal of charges on particles, and, second, the growth of these nuclei to a size at which they will rapidly settle from the solution. When the combination of sodium aluminate and bentonite is used, the bentonite particles, being highly hydrated and insoluble, serve as the nuclei on which the condensation of or separation of the ions from solution proceeds. Bentonite particles are extremely small, being of colloidal dimensions (from 1 to 500 millimicrons in size) and so the material presents a relatively large surface in the solution for this condensation or separation of the ions to occur. After this has taken place, the sodium aluminate hydrolyzes and produces hydrous aluminum oxide which has an ability to gather these nuclei into larger clumps so that after a short period of time a highly hydrated, very large, rapidly settling floc is produced.

Yet another factor probably plays an important part in the coagulation process where these two materials are used in combination. It has been found that as little as one part of sodium aluminate to 50 parts of bentonite will form a gel when four grams of the combination are added to 100 c.c. of water. In the absence of any sodium aluminate, however, only a thin fluid suspension results when the same quantity of bentonite is added to water. Furthermore, a predominant factor in the gelation of colloidal clay suspensions of low concentrations is the adsorption of the dispersing medium on the dispersed particles as indicated by the abnormal increase in specific gravity. This would indicate that the sodium aluminate enhances the extent of hydration of the bentonite and thereby causes it to form large flocculent particles which have a tendency to clear the water and settle rapidly. As is well known, the volume of floc resulting from the use of the coagulant in water treatment is directly related to its effectiveness in removing the suspended matter causing turbidity.

We have found that in general a ratio of one part by weight of sodium aluminate (containing 57% $Al_2O_3$ and 35% $Na_2O$) to four parts of bentonite results in a satisfactory mixture as a coagulant for use in accordance with this invention. A dosage of from between 0.05 to 0.5 pound of the combination per 1000 gallons of water treated is usually sufficient to obtain the desired results. However, it will be clear that the various concentrations, proportions, and amounts of the substances used may be varied within wide limits, depending upon the water to be treated, the characteristics of the floc desired, etc. It will also be clear that other alkali metal aluminates, such as potassium or lithium aluminates, may be substituted for the sodium aluminate shown in the specific examples given.

The aluminate-bentonite combination may be incorporated into the water to be treated in any manner desired. In plants where dry feeding equipment is employed, the materials may be mixed dry and can be fed simultaneously into the water to be treated in the desired proportions. Where solution feed is used, however, we prefer to make up solutions of aluminate and bentonite separately and to feed them in the desired proportions into the water to be treated from separate tanks.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A coagulant for water treatment which comprises a mixture of an alkali metal aluminate and bentonite.

2. The coagulant recited in claim 1 wherein the product is in the dry powdered state.

3. A coagulant for water treatment which comprises a mixture of about one part by weight of sodium aluminate and four parts by weight of bentonite.

4. In a process of treating water the step which comprises adding thereto an alkali metal aluminate and a colloidal clay which hydrates and swells on addition to water.

5. A process of softening water which comprises treating said water with a hardness-precipitating chemical, sodium aluminate and bentonite.

6. The process recited in claim 5 in which the weight ratio of aluminate to bentonite is about one to four.

7. The process recited in claim 5 in which the combined amount of aluminate and bentonite added to the water is between about 0.05 and 0.5 pounds (dry basis) per 1000 gallons of water.

8. In a process of softening water by the lime-soda ash method, the improvement which includes the step of adding a small amount of sodium aluminate and bentonite to the water.

9. In a process of softening water by the addition of lime the improvement which includes the step of adding small amounts of sodium aluminate and bentonite to the water as a coagulant therefor.

10. In a process of softening water involving the application of heat and the addition thereto of hardness-precipitating chemicals, the improvement which includes the step of adding to the treated water sodium aluminate and bentonite.

FREDERICK K. LINDSAY.
JOHN W. RYZNAR.